United States Patent [19]

Sato et al.

[11] Patent Number: 4,805,795
[45] Date of Patent: Feb. 21, 1989

[54] BUTT-WELDED CANS AND PROCESS FOR MANUFACTURING THE SAME

[75] Inventors: Nobuyuki Sato, Yokohama; Hiroshi Matsubayashi, Kamakura; Seishichi Kobayashi, Yokohama; Minoru Mitsuhashi, Yokohama; Kenji Matsuno, Yokohama; Kazuhisa Ishibashi, Tokyo, all of Japan

[73] Assignee: Toyo Seikan Kaisha Ltd., Japan

[21] Appl. No.: 140,603

[22] Filed: Dec. 28, 1987

[30] Foreign Application Priority Data

Dec. 27, 1986 [JP] Japan ................................. 61-310194
Jan. 9, 1987 [JP] Japan ................................. 62-3022
Jan. 20, 1987 [JP] Japan ................................. 62-10959
Jan. 20, 1987 [JP] Japan ................................. 62-10960
Jan. 20, 1987 [JP] Japan ................................. 62-10961

[51] Int. Cl.⁴ .......................................... B23K 26/18
[52] U.S. Cl. ...................................... 220/75; 228/118; 228/151; 228/214; 413/77; 29/33 D; 219/64; 428/35.8; 220/454; 220/456; 220/DIG. 29
[58] Field of Search ................ 228/118, 144, 149–151, 228/214; 413/77; 428/35; 220/DIG. 29, 62, 75, 454, 456; 219/64; 29/33 D

[56] References Cited

U.S. PATENT DOCUMENTS 4,471,883 9/1984 Kitamura et al. .................. 220/456
4,662,558 5/1987 Hamanaka ........................... 228/118
4,735,835 4/1988 Taira et al. ............................ 220/75

FOREIGN PATENT DOCUMENTS 2114615 10/1972 Fed. Rep. of Germany ...... 228/214
62749 6/1978 Japan .................................. 228/214
405681 3/1974 U.S.S.R. ............................. 228/214
633695 11/1978 U.S.S.R. ............................. 228/118

Primary Examiner—Nicholas P. Godici
Assistant Examiner—Samuel M. Heinrich
Attorney, Agent, or Firm—Saidman, Sterne Kessler & Goldstein

[57] ABSTRACT

There is here provided butt-welded cans made of steel plates having a carbon concentration of 0.02 to 0.09% by weight, the aforesaid butt-welded cans being characterized in that a coating film for preventing the adhesion of melted metal particles is applied to at least the inner surface of the weld portion and its vicinity of each can, and a carbon concentration index I of the weld portion satisfies the formula (1)

$$I = (Iw/Ic) \times 10^3 \leq 15 \qquad (1)$$

wherein Iw is a Kα X ray intensity, of carbon in the weld portion, measured by the EPMA method, and Ic is a Kα X ray intensity, of carbon in graphite, measured by the EPMA method.

4 Claims, 3 Drawing Sheets

SECTION OF WELD PORTION

BUTT-WELDED CANS AND PROCESS FOR MANUFACTURING THE SAME

BACKGROUND OF THE INVENTION

1. Field of the Invention

The present invention relates to butt-welded cans, and more particularly it relates to laser butt-welded cans each having a weld portion which is provided with a coating film for preventing melted metal particles from adhering to the weld portion at the time when can blanks of sheet steels are butt-welded, the aforesaid weld portion being maintained at a low carbon concentration, and a process for manufacturing the above-mentioned cans.

2. Description of the Prior Art

Heretofore, to manufacture can by roll-forming thin metal plates and then welding the edges thereof, a resistance seam welding (lap welding) technique has been mainly used. In this weld process, the edges of each plate are lapped over each other, and therefore some through holes are liable to appear in a double seaming portion. Further, since the lapped edges of the metal plate are heated and welded, an unpainted portion called a margin is required as much as a width of at least 2 mm in the joined portion of each blank plate for cans, and the inner surface corresponding to the margin must be coated again for anticorrosion and the outer surface of the can has a large unprinted area disadvantageously.

On the other hand, no less than about 2,000 kinds of lasers have been developed of late since the oscillation of a ruby laser succeeded in 1960, and they are now widely employed in various fields.

In the field of thermal treatments which includes welding, cutting and the like, since a carbonic acid gas laser ($CO_2$ laser) with continuous oscillation was developed, the practical utilization of the laser has been made.

At present, the $CO_2$ laser having an output of 20 kW or less is on the market and is tried in the thermal treatments (welding, cutting, surface treatment, padding and the like).

The features of the laser weld are as follows: (1) Welding can be accomplished under noncontact; (2) since the area to be heated is small and a welding velocity is high, the influence of heat on the weld portion is small; (3) the heat working of high-temperature-melting materials, heat-resistant alloys and the like is possible; and (4) the weld between different kinds of metals is also possible. In particular, the $CO_2$ laser has the following features: (1) A high output up to 20 kW can be produced; (2) continuous oscillation and repeated pulse oscillation can be provided; (3) laser conversion efficiency is high (about 20% or more); (4) propagation loss in the air is small; (5) accuracy requirement for optical elements is not so severe; (6) since the $CO_2$ laser is a gas laser, there is no problem of the breakage of a laser medium due to a high output; and (7) since a material to be consumed is substantially a gas, maintenance cost is lower as compared with the other kinds of lasers.

If metal cans can be manufactured by the use of the $CO_2$ laser, the following advantages are obtained which are superior to the conventional manufacturing process by the utilization of resistance heat:

(a) Butt-welding can be realized, and therefore any step is not present in a joint portion, and double seaming of lids can be carried out without any problem. Accordingly, the appearance as well as the performance of the thus manufactured cans is also excellent.

(b) Since weld width is as narrow as about 0.2 mm, the manufactured cans have a good appearance. In the case of the conventional resistance weld process, a margin of about 2 mm is necessary, as described above.

(c) The cans having small diameters such as outer cans for dry cells and cans for Aerosol cans can be manufactured. However, in the resistance welding process, an electrode bar is required to be disposed inside each can, and thus the acceptable diameter of the, cans is limited.

(d) In addition to tinplates, metals such as tin free steel and Al can also be welded.

Even in the cans welded by the use of the $CO_2$ laser, the butt edges of the metal are melted, and therefore an unprinted margin is required along the edges of the can blank, though it is narrower than in the conventional resistance welding process. In particular, for the inner surfaces of the cans, the so-called repair coat is carried out by applying an organic resin to the weld portion and its vicinity on the inner surfaces in order to ensure anticorrosion after welding.

In order to manufacture the laser-welded cans excellent in anticorrosion and sealing properties, it is necessary that the surface of the weld portion is smooth so as to facilitate the repair coat by the application of an organic resin after welding and is excellent in flanging, double seaming, beading, necked-in working and the like which are needed in manufacturing the cans.

In the conventional technique, however, the margin must be taken along the butt edges of the can blank, and the melted metal particles fly about in welding and then adhere to the weld portion and its vicinity again, so that the surface of the weld portion becomes rough, which leads to the problem that the application of the organic resin for the repair coat cannot be achieved perfectly.

Further, in the conventional process, when a lid is mounted on each can body in the double seaming manner, some cracks take place in the weld portion at times, and for this reason, the laser-welded cans having excellent anticorrosion and sealing properties cannot be manufactured stably.

The above description is concerned with the weld portion on the inner side of the can.

For the treatment of the outer side of the can, it is essential to make the most of energy from a laser beam for welding the metal plate. Needless to say, it is effective for this purpose to take the extensive margin, but it should be considered that also on the outer surface of the can, the melted metal particles fly about, though the amount of the metal particles is less than on the inner side of the can. In this sense, it is preferred that certain measures are taken to prevent the melted metal particles from adhering to the outer surface. Further, the present invention aims at putting the manufacturing process of the welded cans by the $CO_2$ laser to practical use, and for the purpose of keeping up the advantageous appearance that the weld width is narrow, the can blank is preferably used in which the outer surface is also painted all over, since it is very difficult to provide the margin as narrow as about 0.2 mm.

On the other hand, metals such as iron and aluminum are believed to have a reflectance of 90% or more at an oscillation wavelength in the $CO_2$ gas laser and vicinities, and when the margin is taken, most of the laser output irradiated on the material is reflected on its surface. In consequence, it is thought that the power, which can be absorbed by the irradiated surface and its vicinity and be then converted into heat, is 10% or less.

Some patent publications and literature have reported that the absorption of the laser beam is heightened by applying a suitable coating film to the metal (Japanese Patent Laid-open Publication Nos. 56-160,893, 56-160,894 and 60-18,291). These publications describe the surface treatment and cutting (grooving) of metals, but embodiments of coating materials for welding are not seen anywhere.

If a suitable coating material is acquired which, however, is not always essential in the manufacture of the cans, the application of the coating material is possible all over the outer surface of the can, so that the margin can be omitted therefrom, the adhesion of the melted metal particles can be prevented perfectly, and a printed area on the outer surface thereof can be enlarged, which is also preferable from the viewpoint of the appearance of the cans.

SUMMARY OF THE INVENTION

An object of the present invention is to provide butt-welded cans in which the surfaces of weld portions and their vicinities are smooth in order to facilitate the repair coat of the weld portions with an organic resin coating material and in which no cracks occur in the weld portions in working and which are excellent in anticorrosion, workability and sealing properties. Another object of the present invention is to provide a method for manufacturing the above-mentioned cans.

A first aspect of the present invention is directed to butt-welded cans made of steel plates having a carbon concentration of 0.02 to 0.09% by weight, the aforesaid butt-welded cans being characterized in that a film for preventing the adhesion of melted metal particles is applied to at least the inner surface of the weld portion and its vicinity, and a carbon concentration index I of the weld portion satisfies the formula (1)

$$I = (Iw/Ic) \times 10^3 \leq 15 \tag{1}$$

wherein

Iw is a $K\alpha$ X ray intensity, of carbon in the weld portion, measured by the EPMA method, and Ic is a $K\alpha$ X ray intensity, of carbon in graphite, measured by the EPMA method.

A second aspect of the present invention is directed to a method for manufacturing butt-welded cans which is characterized by comprising the steps of applying a 0.5 to 3.5μm thick organic resin coating material for preventing the adhesion of melted metal particles to at least a 1mm-wide region from the butt-weld portion edge of at least the inner surface of a steel plate can blank having a carbon concentration of 0.02 to 0.09% by weight; and butt-welding the edges of the can blank by the use of a laser.

A third aspect of the present invention is directed to a method for manufacturing butt-welded cans which is characterized by comprising the steps of applying a 0.5 to 7.0μm thick organic resin coating material to a steel plate can blank; butting the opposite edges of the can blank; and laser-welding the butted edges, while a cooling device is brought into contact with the butted edges from the inner side of the can.

In applying a resin coating material to the butted portion and its vicinity on the outer surface of the can prior to the laser weld, it is preferred to use a coating material in which in thermogravimetric analysis (TGA) at a temperature rise velocity of 20° C./min. in a nitrogen gas flow, the temperature at which a thermogravimetric weight reduction ratio of the coating material reaches 50% is 470° C. or more.

DESCRIPTION OF THE PREFERRED EMBODIMENTS

Figure 1:
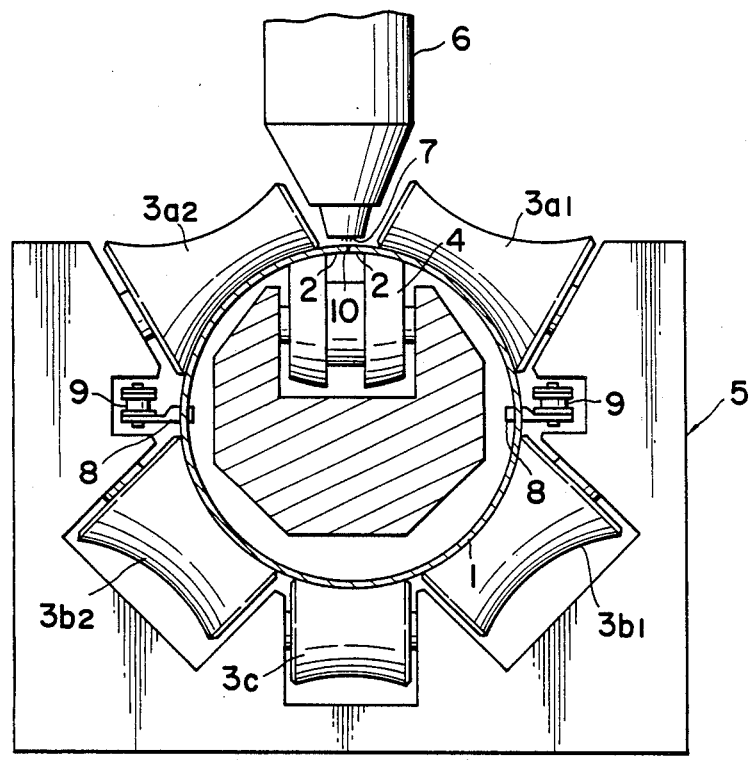
FIG. 1 is a cross sectional view of the laser welding apparatus for manufacturing butt-welded cans of the present invention.

The inventors of the present application have found that if a coating film for inhibiting the adhesion of melted metal particles is provided in a weld portion and its vicinity on at least the inner side of a can blank, the butt-welded cans can be obtained in which the melted metal particles do not have adhered to the weld portion and its vicinity at the time of welding. However, when disposed therein, the effective and convenient organic resin coating film is decomposed during welding, so that carbon in the film is dissolved in the wild portion and hence the content of carbon therein increases, which causes cracks in the weld portion in the subsequent working step. As a result of further researches, it has been found that the above problem can be solved by controlling the thickness of the coating film, or alternatively when the film is thick, by cooling the weld portion from the inner side of the can during welding. Here, the present invention has been completed on the basis of this knowledge.

The coating film for preventing the adhesion of the melted metal particles is preferably an organic resin coating film, since such a kind of coating film does not allow oxides and the like to remain in the melted portion of the can. The thickness of the coating film is preferably within the range of 0.5 to 3.5 μm.

The thickness of the coating film requires within the range of 0.5 to 7.0μm. If the thickness is more than 3.5μm, it is necessary to contact a cooling device on the weld portion from the inner side of the can during welding.

Needless to say, it is more preferable that the thickness of the coating film is from 0.5 to 3.5 μm and the butted portion of the can stem blank is cooled with a cooling device from its inner side during welding.

The materials for the cans of the present invention include tinplates, tin-free steel extremely thin nickel-plated steel plates, tin-nickel alloy-plated steel plates and the like. A preferable material is the steel plate, having a thickness of 0.10 to 0.35 mm, which has been subjected to a anticorrosion plating treatment and a surface treatment to heighten adhesive properties to the organic resin coating film. The concentration of carbon in the usable steel plate material is within the range of 0.02 to 0.09% by weight. When the carbon concentration therein is in excess of 0.09% by weight, the carbon content in the weld portion does not satisfy the formula (1), even if the thickness of the film is controlled well. As a result, the workability of the weld portion is poor and some cracks are liable to occur therein during working the cans. Inversely, the steel plate in which the carbon content is less than 0.02% by weight is expensive, and the use of such a steel plate is not economical. Further, the steel plate in which the thickness is more than a level of 0.35 mm is expensive, and the use of such a thick steel plate is not economical; when the steel plate of less than 0.10 mm in thickness is used, strength and rigidity of the manufactured cans are insufficient.

In order to dispose the coating film for preventing the adhesion of the melted metal particles in the weld portion and its vicinity on at least the inner side of the can, it is convenient to form the coating film on the butted edges of the can blank which is still in the state of a plate. As the material of this coating film, an organic resin coating material is advantageous, and when the thickness of the coating film is 0.5 $\mu$m or more, the very smooth weld portion can be obtained to which the melted metal particles do not adhere. When the thickness of the film is less than 0.5 $\mu$m, the weld portion and its vicinity are roughened owing to the adhesion of the melted metal particles flown by the heat in welding, and the organic resin cannot be applied perfectly to the rough area in the subsequent repair coat step, so that satisfactory anticorrosion cannot be expected.

When the organic resin coating film is disposed in the butted portion on the inner side of the can, a part of the organic resin film therein is carbonized during laser-welding and is incorporated into the melted metal in the butted portion, so that the carbon content in the weld portion increases and thus hardening is accelerated. Now, the relation between the carbon concentration and workability in the weld portion was inspected after the welding step. As a result, it was appreciated that when the thickness of the organic resin film was such that the carbon concentration index I of the following formula (1) was 15 or less in accordance with the EPMA (Electron Probe Micro Analyser) method, the usually usable steel plate having a carbon concentration of 0.02 to 0.09% by weight could provide the welded cans which were excellent in workability:

$$I = (I_w/I_c) \times 10^3 \leq 15 \tag{1}$$

wherein $I_w$ is a K$\alpha$ X ray intensity, of carbon in the weld portion, measured by the EPMA method, and $I_c$ is a K$\alpha$ X ray intensity, of carbon in graphite, measured by the EPMA method.

When the index I is more than 15, the workability of the weld portion is poor, and some cracks tend to take place therein. The upper limit of the thickness of the organic resin coating film is preferably 3.5 $\mu$m or less, depending on the carbon concentration in the steel plate. When the thickness of the coating film exceeds the above upper limit, the workability of the can is bad due to undue hardening of the weld portion, even if the carbon concentration in the steel plate is near to the lower limit.

However, as a result of the inspection of the relation between the carbon concentration and workability in the weld portion after the welding step, it was found that when a certain strategy was taken so that carbon produced by the thermal decomposition during welding might not be incorporated into the melted weld portion, the workability could be maintained in a good state, even if the organic resin coating film having a thickness of 3.5 $\mu$m or more was formed thereon. The one effective strategy is to cool the weld portion from the inner side of the can during welding.

However, when the thickness of the organic resin film is more than 7.0 $\mu$m, the carbon concentration index of the weld portion exceeds a level of 15, even if the weld portion is cooled in such a way. In this case, the workability of the weld portion is bad and some cracks are liable to occur therein.

The coating film for preventing the adhesion of the melted metal particles should have a width of at least 1 mm from the butt edge of the can blank. The reason why so narrow a coating film is usable is that in the case of the laser weld, a weld width is as narrow as about 0.2 mm, a heating region is also narrow, a weld velocity is high, and the flying range of the melted metal particles from the weld portion is limited. When the film width is less than 1 mm, the adhesion preventing effect of the film cannot cover the range perfectly where melted metal particles are flown about. The coating film having a greater width is acceptable without any trouble, because another coating material is applied to the weld portion having the film in a subsequent repair coat step for anticorrosion.

For the coating films for preventing the adhesion of the melted metal particles, optional protective coating materials can be used which comprise thermosetting and thermoplastic resins. Examples of the coating materials include modified epoxy coating materials such as phenolepoxy coating materials and aminoepoxy coating materials; vinyl and modified vinyl coating materials such as vinyl chloride-vinyl acetate copolymers, partially saponified vinyl chloride-vinyl acetate copolymers, vinyl chloride-vinyl acetate-maleic anhydride copolymers, and epoxy-modified, epxoyamino-modified, and epoxyphenol-modified vinyl resin coating materials; acrylic resin coating materials; and synthetic rubber coating materials such as styrene-butadiene copolymers, and they can be used alone or in a combination thereof.

The coating material may be applied to the metal blank in the state of the solution of an organic solvent such as an enamel or lacquer, or in the state of an aqueous dispersion or aqueous solution by means of roller coating, spray coating, dip coating, electrostatic coating or electrophoretic deposition. Needless to say, in the case that the resin coating material is thermosetting, it may be baked, if necessary. Further, the coating material may contain a white pigment such as titanium white, another pigment or a dye.

Next, reference will be made to conditions for the butt weld of the can blank. A laser welding apparatus is necessary to be able to irradiate the butt portion with a laser beam spot precisely, while moving the roll formed blank at a constant speed after butting the edges of the can blank accurately. A concrete example of the laser welding apparatus is shown in FIG. 1. That is, FIG. 1 is a cross sectional view of the laser welding apparatus for manufacturing butt-welded cans of the present invention.

In FIG. 1, reference numeral 1 is a can blank, $3a_1$, $3a_2$, $3b_1$, $3b_2$ and $3c$ are supporting and feeding rolls by which the edges of the can blank are butted with accuracy. Numeral 4 is a roll for supporting the edges of the can blank and feeding the blank on the inner side of the can, and numerals 8 and 9 are devices for feeding the can blank in compliance with a weld velocity. Numeral 5 is a holder for the respective rolls on the outer side. Numerals 6 and 7 are a laser oscillator and laser beam spot, respectively. Numeral 10 is a weld portion of the can blank, and 2 is a coating film, for preventing the adhesion of melted metal particles, disposed in the weld portion on the inner side of the can.

As the laser oscillator, a kind of $CO_2$ gas laser is preferable from the viewpoints of output and economy. The output of the laser is preferably 0.6 kW or more. When it is 0.6 kW or less, the sufficient weld of the steel cannot be achieved and the stable laser weld finish cannot be obtained.

The diameter of the beam spot is preferably within the range of 0.10 to 0.25 mm. When the spot diameter is less than 0.10 mm, it is difficult to acquire the stable weld finish having a uniform weld width in the weld direction on account of a limited mechanical butt accuracy. When it is more than 0.25 mm, the weld width is too great, and therefore the amount of the organic resin film involved in the weld portion increases, so that it is impossible to satisfy the requirement that the carbon concentration index of formula (1) should be 15 or less, with the result that the workability of the weld portion is bad.

The weld velocity is preferably 10 m/min. or more. When it is less than 10 m/min., a weld width is enlarged and the amount of the organic resin coating film in the weld portion increases, so that it is impossible to satisfy the requirement that the carbon concentration index of formula (1) should be 15 or less, with the result that the workability of the weld portion is bad.

Figure 2:
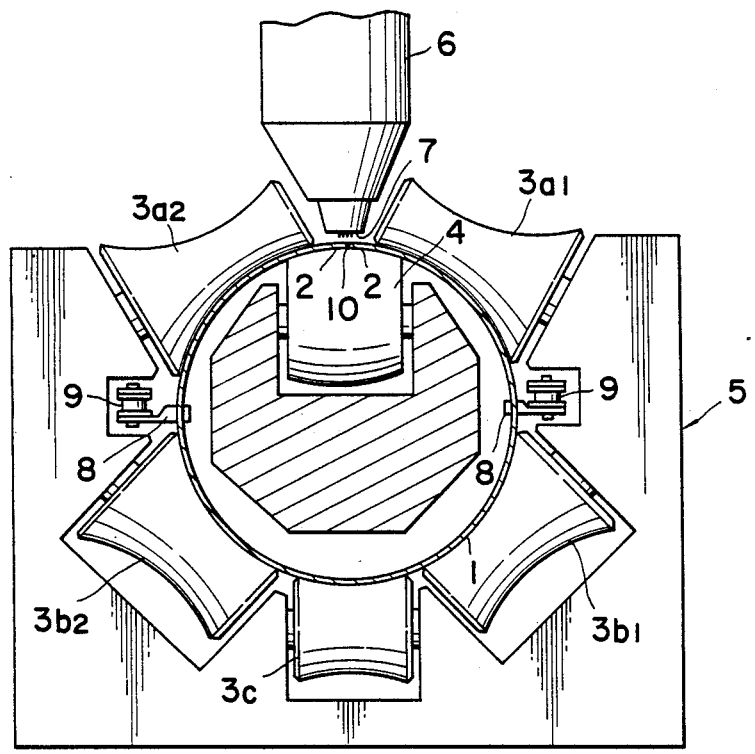
FIG. 2 is a sectional view of the welding apparatus in which the weld portion is brought into contact with a cooling roll.

In the case that the thickness of the film for preventing the adhesion of the melted metal particles is as much as 3.5 to 7.0 $\mu$m, after the opposite edges of the can blank are butted, the laser welding is then carried out, cooling the butt portion from the inner side of the can, as described above, in order to inhibit carbon produced by the decomposition of the film resin from being incorporated into the weld portion. Needless to say, even if the thickness of the film is within 0.5 to 3.5 $\mu$m, the cooling device may be used. An embodiment of this system is shown in FIG. 2. That is, FIG. 2 is a sectional view of the welding apparatus in which the weld portion is brough into contact with a cooling roll.

The structure in FIG. 2 is the same as in FIG. 1 with the exception that the roll 4 for supporting the butt portion of the can blank on the inner side is only different. The other symbols are the same as in FIG. 1. In FIG. 2, the roll 4 is not separated from, but brought into contact with the weld portion on the inner side. This roll 4 functions to cool the inner surface of the weld portion under melting so as to prevent carbon from getting thereinto.

As is apparent from the foregoing, the above-mentioned means can control the carbon concentration in the weld portion, and achieve the object of preventing the melted metal particles from adhering to the inner surface of the can.

If a coating material is found out which permits the energy from the laser beam to be effectively utilized in welding, the coating material can be preferably applied all over the outer surface of the can without any margin. Researches have been conducted on this theme, and it has been found that a coating film having good resistance to thermal decomposition is desirable as the above-mentioned coating film.

Generally, the usual resin coating film generates heat by absorbing the laser beam, even though the absorbance of the laser beam are low. Further, when most of the laser beam coming through the coating film is reflected on the metal plate a part of the beam is absorbed by the metal plate, consequently heating the latter, the coating film is also heated by this heat.

In this way, the coating film generates the heat or is heated, or both of these effects occur in the film, so that the temperature of the coating film rises. In this case, the usually used coating film for cans is thermally decomposed and the generated heat is then consumed by the endothermic decomposition reaction, so that a further temperature rise is inhibited. However, if the resin coating film is not easily decomposed and the heat consumption by decomposing reaction is reduced, the surface temperature is raised so as to rapidly enhance the absorbance of the laser beam by the metal plate along with the rise of the temperature, the absorbance of the laser beam by the metal plate can be heightened and in turn the weld efficiency can be improved.

As for the outer surface of the can, it is preferred that at least the weld portion and its vicinity of the outer side are coated with the coating material which is such as to provide a resin coating film in which in thermogravimetric analysis (TGA) at a temperature rise velocity of 20° C./min. in a nitrogen gas flow, the temperature at which a thermogravimetric weight reduction ration of the resin coating film reaches 50% is 470° C. or more, and the metal blank is then butt-welded by means of the $CO_2$ laser.

The thickness of the coating film on the outer surface of the can may be as much as about 10 $\mu$m, because carbon produced by the decomposition of the coating film is not dissolved in the melted metal to heighten the concentration of carbon. The reason why the produced carbon is not dissolved in the metal would be that the coating film in the weld portion is exposed directly to the laser beam and is decomposed and evaporated until the weld temperature has been reached.

The temperature (hereinafter referred to simply as T50) at which the thermogravimetric weight reduction of the resin coating film reaches a level of 50% is preferably 490° C. or more.

It should be here noted that the coating film for the outer surface of the can must be constituted on the premise that the inner surface and weld portion thereof are treated in the above manner.

Examples of the resins having high heat resistance include phenolic resins and fluoride resins, and other heat-resistant resins are also acceptable in which each resin having high heat resistance is copolymerized or mixed with a usually used resin such as an epoxyphenolic resin. Further, it is also acceptable and effective to add secondary components for improving heat resistance to the resin film. The addition of a flame retardant such as phosphoric ester is also possible and effective. When the resin having the high heat resistance is copolymerized or mixed with the usually used resin or when the flame retardant is added to the resin, the amount of each of the heat-resistant resin and the flame retardant is 15 phr or more. Preferably, the amount of the heat-resistant resin is 20 phr or more and that of the flame retardant is 30 phr or less based on the solid content of the usual resin. When the amount of the heat-resistant resin or flame retardant is less than 15 phr, T50 cannot get at 470° C. or more.

Examples of the usually used coating resins for cans which are poor in heat resistance include epoxy ester-amino resins, acrylamino resins, alkydamino resins, epoxyurea resins, oily coating materials and polyesters, and they may be used in the present invention by blending with heat-resistant resins such as fluoride resins, e.g., PTFE, phenolic resins, PVDF, polyamide-imides, polyimides and polyether sulfones in order to improve the heat resistance.

For the purpose of heightening the heat resistance of the resin coating film, fine grains of an inorganic filler may be added to the resin. In this case, the resin itself may not be always high in heat decomposition resistance.

The grain diameter of the inorganic filler should be such that a white appearance having a concealment efficiency is obtained and the coating film is provided with satisfactory luster. The average train diameter of the inorganic filler is preferably 3 μm or less, and the amount of the filler is preferably 10% by volume or more in terms of volume fraction based on the total amount of the solid content of the resin and the filler. When the grain diameter is more than 3 μm, the effect of the filler is not displayed in the coating film, depending on its amount, and the white appearance having the concealment efficiency and the luster of the coating film deteriorate. When the amount of the filler is less than 10% by volume, similar deteriorations are seen. Inversely, when it is too much, the adhesive strength of the vehicle declines, and therefore the preferable amount is 40% by volume or less.

Examples of the preferable white inorganic fillers include titanium oxide, aluminum oxide, zinc oxide, barium sulfate, calcium carbonate and calcium sulfate, an they may be used alone or in a combination thereof. Of these fillers, the titanium oxide is most preferable in points of the concealment efficiency and chemical resistance.

Examples of the resins to which the inorganic fillers can be added include epoxy ester-amino resins, acrylamino resins, alkydamino resins, epoxyurea resins, oily coating materials and polyesters which are conventional coating materials for cans. Further, the preferable resins to which the inorganic fillers may be added are phenolic resins, fluoride resins and polyimides having high thermal decomposition resistance by themselves as well as mixtures and copolymers of these resins and the above-mentioned usual resin.

Another means for enhancing the heat resistance of the resin film is to add fine metal powder to the resin. Since the metal powder itself reflects most of the laser beam, it has not been conceived heretofore to use the metal powder in the laser beam weld technique. Nevertheless, the inventors of the present case have found that the addition of the fine metal powder to the coating film builds up the thermal decomposition resistance so as to improve the weld effect.

The grain diameter of the metal powder is crucial to the quality of the coating film, because the metal powder in the coating film must be uniformly dispersed therein to display its effect uniformly. The average diameter of the metal powder is preferably 15 μm or less. If one kind of metal powder is used, a smaller grain diameter is preferable. The average grain diameter can be observed by the use of a microscope. In the case that most of the metal powder has the shape of flake rather than sphere, the average diameter is based on the long diameter of each flaky grain.

The amount of the metal powder naturally depends on the grain diameter, but generally the metal powder in an amount of 5% by volume or more based on the solid content of the resin can provide the sufficient effect.

The greater the amount of the metal powder is, the greater the effect of the metal powder is, but the excessive increase in the metal powder results in the decrease in the resin which is the vehicle of the coating material, so that the adhesive force of the resin declines and the reflective effect of the metal powder is excessively great. Therefore, the preferable amount of the metal powder is 40% by volume or less.

Examples of the metal powder materials include Al, Ni, Sn and Zn, and stainless steel powder is also usable. These metal powder materials may be used alone or in a combination thereof.

Examples of the resins to which the metal fine powder is added include epoxy ester-amino resins, acrylamino resins, alkydamino resins, epoxyurea resins, oily coating materials and polyesters which are conventional coating materials for cans. The coating film comprising the resin mentioned above is insufficient in point of the resistance to the thermal decomposition in the irradiation of the $CO_2$ laser beam, and thus T50 is not so high. However, if the metal powder is added to the resin and is not distributed uniformly metric analysis (TGA) reaches 50% is not so high. However, if the metal powder is added to the resin and is distributed uniformly therein, T50 of the coating film can be heightened up to a very high level. For example, T50 of the epoxy ester-amino resin alone is 460° C., but when 10% by volume of aluminum powder is added thereto, T50 of the coating film containing the powder goes up to 490° C. Needless to say, it is preferred that the fine metal powder is added to each of mixtures and copolymers of the above-mentioned usual resins and phenolic resins, fluoride resins and polyimides having high thermal decomposition resistance by themselves.

In the above description, it has been referred to that the thermal decomposition resistance of the coating film can be improved up to a certain standard or higher by blending an epoxy ester-amino resin, acrylamino resin, alkydamino resin or the like which is poor in thermal decomposition resistance with a fluoride resin, e.g., PTFE, phenolic resin, PVDF, polyamide-imide, polyimide and polyether sulfone having high heat resistance. In addition, the present inventors have found that organopolysiloxanes have high thermal decomposition resistance and can be blended with a usual coating resin for cans and that they can be used in place of the above-mentioned resins in order to form the coating film. There is provided a method for manufacturing cans by welding metal blanks which comprises the steps of applying, to at least a weld portion and its vicinity of each blank, a coating material mainly comprising one or more resins selected from the group consisting of (1) an organopolysiloxane, (2) a copolymer of an organopolysiloxane and a coating resin for cans, and (3) a mixture of a liquid or powdery organopolysiloxane and a coating resin for cans; and butt-welding the metal blanks by the use of a $CO_2$ laser.

Preferable examples of the organopolysiloxanes used in the present invention include dimethyl polysiloxane and methylphenyl polysiloxane. Conveniently, the organopolysiloxanes can be employed in the various states of oil, rubber and resin, and therefore the following organopolysiloxanes can be used in the present invention.

$(CH_3)_3SiO[Si(CH_3)_2]_7Si(CH_3)_3$,
$(CH_3)_3SiO[Si(CH_3)_2]_8Si(CH_3)_3$, $(CH_3)_3SiO[Si(CH_3)_2]_9Si(CH_3)_3$, $[(CH_3)_2SiO]_7$, $[CH_3SiO_{1.5}]_6$, $CH_3SiO_{1.5}]_8$, $[CH_3SiO_{1.5}]_{12}$, $[(CH_3)_3SiO]_3SiCH_3$, $[(CH_3)_3SiO]_4Si$, $[(CH_3)_2SiO]_2[(CH_3SiO_{1.5}]_3$, $(C_2H_5)_3Si\text{-}OSi(C_2H_5)_3$, $[(C_2H_5)_2SiO]_3$, $[(C_2H_5)_2SiO]_4$, $[(C_2H_5)_2SiO]_5$, $[(C_6H_5)_2Si]_2O$, $(C_6H_5)_2Si[OSi(CH_3)_3]_2$, $C_6H_5Si[OSi(CH_3)_3]_3$, $[(C_6H_5)_2SiO]_3$, $[(C_6H_5)_2SiO]_4$, $[(C_6H_5)(CH_3)SiO]_3$ (cis), $[(C_6H_5)_3(CH_3)SiO]_3$ (trans), $[(C_6H_5)(CH_3)SiO]_4$, $[(CH_3)_2SiO]_2(C_6H_5)_2SiO$, $(C_6H_5SiO_{1.5})_6$, $H(CH_3)_2SiOSi(CH_3)_3$, $[H(CH_3)_2Si]_2O$, $(CH_3)_3SiO[SiH(CH_3)O]Si(CH_3)_3$, $(CH_3)_3SiO[SiH(CH_3)O]_2Si(CH_3)_3$, $(CH_3)_3SiO[SiH(CH_3)0_3]Si(CH_3)_3$, $(CH_3)_3SiO[SiH(CH_3)O]_4Si(CH_3)_3$, $(CH_3)_2SiO[SiH(CH_3)O]_5Si(CH_3)_3$, $[H(CH_3)SiO]_3$, $[H(CH_3)SiO]_4$, $[H(CH_3)SiO]_5$, $[H(CH_3SiO)]_6$, $[H(CH_3)SiO]_7$, $[H(C_6H_5)SiO]_3$, $[HO(CH_3)_2Si]_2O$, $[HO(CH_3)(C_6H_5)Si]_2O$ (mess), $[HO(CH_3)(C_6H_5)Si]_2O$ (d,l), $[HO(C_6H_5)_2Si]_2O$, $[CH_3O(CH_3)_2Si]_2O$, $[C_2H_5O(CH_3)_2Si]_2O$, $[C_2H_5O(C_6H_5)_2Si]_2O$, $[(OCN)(CH_3)_2Si]_2O$, $[CH_2=CH(CH_3)_2Si]_2O$, $[CH_2=CH(CH_3)SiO]_3$, $[CH_2=CH(CH_3)SiO]_4$, $[CH_2=CH(CH_3)SiO]_5$, $[CH_2=CH(CH_3)SiO]_6$, $[CH_2=CH(C_6H_5)SiO]_4$, $[CH_2=CHCH_2Si(CH_3)_2]_2O$, $[CH_2=CHCH_2Si(CH_3)O]_3$, $[CH_2=CHCH_2Si(CH_3)O]_4$, $[(CF_3CF_2CF_2CH_2CH_2)_3Si]_2O$, $[CF_3CH_2CH_2Si(CH_3)O]_3$, $[CF_3CH_2CH_2Si(CH_3)O]_4$, $[CF_3CF_2(CH_2)_2Si(CH_3)O]_3$, $[CF_3CF_2(CH_2)_2Si(CH_3)O]_4$, $[CF_3(CF_2)_2(CH_2)_2Si(CH_3)O]_3$, $[CF_3(CF_2)_2(CH_2)_2Si(CH_3)O]_4$, $[ClCH_2Si(CH_3)_2]_2O$, $[NH_2CH_2CH_2Si(CH_3)_2]_2O$, $[HOOCCH_2CH_2Si(CH_3)_2]_2O$, $[HOOC(CH_2)_3Si(CH_3)_2]_2O$.

Further, there may be also used coating materials mainly comprising copolymers of the organopolysiloxanes and epoxy resins, urethane resins and alkyd resins. Furthermore, the coating materials may be used in which the organopolysiloxanes in the forms of a liquid, a solution of solvent, and a solid powder are mixed with one or more of epoxy ester-amino resins, acrylamino resins, alkydamino resins, epoxyurea resins, oily coating materials and polyesters which are the usually used coating resins for cans. The organopolysiloxane has physical and chemical properties of both inorganic and organic materials which are attributable to the Si-O-Si bond therein, but the degree of such properties depend on a skeleton structure, a polymerization degree and kinds of organic groups. The chemical structure of the organopolysiloxane depends on the number of functional groups per monomer and polymerization conditions, and can take any of oily, rubber and resinous states. When the organopolysiloxane is used in the form of a mixture, it may be mixed directly with the resin in the case that it is oily, or alternatively it may be first dissolved in a solvent and is then mixed with the resin in the case that it is rubber or resinous. Further, when in the state of resinous solid, the organopolysiloxane is first ground into fine powder, and the latter is then dispersed in the coating material and is used. The grain diameter of the organopolysiloxane powder is preferably 5 μm or less. If the resin to which the organopolysiloxane will be added has the high resistance to the thermal decomposition, the good weld finish can be obtained by the irradiation of the $CO_2$ laser beam, but such a resin can be solely used without any organopolysiloxane.

The coating film made from the above-mentioned usual coating material for cans has the low resistance to the thermal decomposition in the irradiation of the $CO_2$ laser beam, and thus T50 is not so high. For example, T50 of the epoxy ester-amino resin is 460° C., but that of dimethyl polysiloxane is as high as 700° C. or more. Therefore, with regard to the coating film made from the resin comprising the mixture or copolymer of the usual resin and the organopolysiloxane, its T50 is high.

The manufacturing method of the laser-welded cans can be put to practical use by applying the coating film having satisfactory heat resistance to the weld portion and its vicinity on the outer side of the can, and then butt-welding the weld portion.

This resin coating film may be applied to the weld portion and its vicinity alone by means of a technique of printing or strip coating. Further, the coating film may be applied as an undercoat for the printing on the blank for cans.

As for the laser weld, the laser beam having a small spread angle which has come from an oscillator is converged into a fine spot by the use of a convergent optical system, and substances to be worked are irradiated with the spot beam, thereby welding a predetermined position.

A weld velocity is required to be 10 m/min. or more, as described above, and when the velocity is less than this level, the productivity of the cans deteriorates and a weld width is extended excessively on condition that a laser output is sufficient.

The butt accuracy of the can blank is required to be 0.05 mm or less.

The output of the laser is connected with its spot beam diameter and can be represented by a value called power density (W/cm$^2$). In order to obtain a uniform weld state in a cross sectional direction in the weld portion, the power density is required to be $10^6$ W/cm$^2$ or more.

Now, reference will be made to a measurement method of the thermal decomposition resistance of the above-mentioned coating film.

The thermogravimetric analysis (TGA) is a technique of pursuing the weight change of a substance in a temperature rise step and is usually used to inspect the behavior of the thermal decomposition. The measured values of TGA are represented by a TGA curve continuously indicating a weight reduction ratio (or amount of the weight reduction) to temperatures. The thermal decomposition resistance of the substance can be evaluated from a temperature (T50) at which the weight reduction ratio is 50% on the TGA curve. The high value of T50 is indicative of the fact that the thermal decomposition resistance is excellent.

In the following formula, the temperature (T50) which can satisfy W=50% is sought from the TGA curve:

$$W = (\Delta M/M) \times 100$$

wherein W is a thermogravimetric reduction weight ratio (%), M is the weight (g) of a sample before measurement, and ΔM is a thermogravimetric reduction weight (g) at T° C.

In the present invention, the coating material is used which can provide the coating film in which T50 is 470° C. or more, the value of T50 being sought by analyzing the coating film sample (which has been peeled from a coated metal plate) at a temperature rise velocity of 20° C./min. in a nitrogen gas flow.

When T50 is less than 470° C., the temperature of the coating film does not rise due to the endothermic decomposition of the coating film, so that the melt of the weld portion is insufficient, which results in the decrease in an area ratio in the weld portion. In the event, under such conditions, the welding is impossible.

Figure 3:
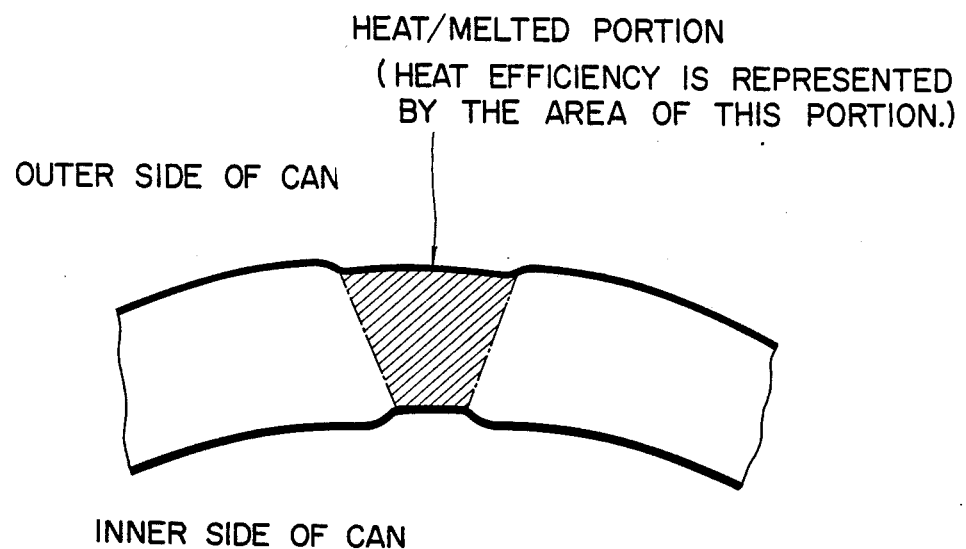
FIG. 3 is a sectional view of the can weld portion which has been heated and melted by the laser beam.

The evaluation of the weld state is carried out by observing the cross section in the weld portion visually and through a microscope. That is, the weld state can be evaluated as follows: The area of the portion heated and melted by the laser beam is sought from a cross sectional photograph (FIG. 3) by the microscope. Next, the reference value of an epoxy ester-amino coating material alone is regarded as 100, and the evaluation is given by multiplying the reference value 100 by the area ratio.

When there is applied, to the weld portion and its vicinity, the resin coating film having the thermal decomposition resistance in which the thermogravimetric weight reduction ratio T50 based on TGA is 470° C. or more, any endothermic decomposition does not take place until the high-temperature level at which the absorbance of the laser beam is high has been reached, even if the resin and metal have the low laser beam absorbance. Therefore, the coating film having T50 of 470° C. or more enables the temperatures of the film and metal plate to efficiently get at the high-temperature level at which the absorbance of the laser beam is high. Once such a high-temperature level is reached, there is no problem, even though the endothermic decomposition occurs at the high-temperature.

Since the butt-welded can of the present invention has the coating film for preventing the adhesion of the melted metal particles in the weld portion and its vicinity on at least the inner side of the can, the particles flown during laser-welding are prevented from adhering thereto again, so that the inner surface of the can is smooth, which permits perfectly carrying out the repair coat in order to obtain excellent anticorrosion. When the organic resin coating film is applied to the weld portion and its vicinity, the carbon concentration therein is generally liable to increase. However, according to the present invention, the carbon concentration therein is regulated to $I \leq 15$, and therefore no cracks take place in the weld portion in a working step such as double seaming of can lids, so that the welded cans excellent in workability and sealing properties can be obtained.

In a method for manufacturing the welded cans, the thickness of the organic resin coating film in the weld and its vicinity is limited to the range of 0.5 to 3.5 $\mu$m, and when the thickness of the film is from 3.5 to 7.0 $\mu$m, the weld portion is cooled by contacting a cooling device therewith from the inner side of the can during laser-welding, in order to inhibit carbon from being dissolved in the melted weld portion. In consequence, the carbon concentration in the weld portion can be stably maintained at $I \leq 15$, so that the can inner surface can be kept smooth and the perfect repair coat can be achieved, and no cracks occur therein during working, whereby the butt-welded cans excellent in anticorrosion, workability and sealing properties can be stably manufactured.

Also with regard to the outer side of the can, when the above-mentioned preferable coating film having the high thermal decomposition resistance is applied to the weld portion and its vicinity, the necessary and enough cross sectional area can be secured in the butt portion of the can by means of the $CO_2$ laser spot beam having a spot beam diameter of 0.10 to 0.25 mm at an output of 0.6 kW or more at a desired welding velocity of 10 m/min. or more without any margin, even if the outer surface of the can is coated all over. Accordingly, the process for manufacturing the welded cans by the use of the $CO_2$ laser can be preferably put to practical use.

In every can of the present invention, any step which results from the overlap of edges of the can blank are not present, and welding width is extremely narrow. Therefore, the appearance of the cans is also excellent. Further, since the margin is small and throughholes are scarcely formed in the double seaming portion, and thus the cans of the present invention are also excellent in anticorrosion. In short, the present invention can contribute to the rationalization of the can manufacture, and thus it is fair to say that the present invention is very useful in the can manufacturing field.

EXAMPLES

Butt-welded cans of the present invention and a process for manufacturing the cans will be described in reference to examples, but the present invention should not be limited to these examples. In the first place, the measurement of a carbon concentration index I and evaluation tests of the laser-welded cans which will be used in the examples will be described.

Measurement of Carbon Concentration Index I

A sample having a size of 1 cm x 1 cm was prepared by cutting the weld portion and its vicinity of the butt-welded can cylinder, and was then fixed in an embedding organic resin. Rough abrasion and mirror polishing were afterward performed respectively by the use of emery paper and alumina abrasive material having a diameter of 0.3 $\mu$m, and for the thus treated smooth sample, the carbon concentration in its section was carried out by the use of the electron probe micro analyser (EPMA) method.

As the measurement conditions of the EPMA method, an accelerating voltage was 10 kV, a sample current was 20 nA (current to graphite), a beam diameter was 50 $\mu$m, and a spectral crystal was a myristate (MYR).

The index I was sought by the following procedure: First, a $CK\alpha$ X ray intensity Iw of the section in the weld portion was calculated from the formula $Iw = Ia - Ib$ wherein Ia was an X ray intensity at a wavelength of 44.6 Å and Ib (background intensity) was an X ray intensity at a wavelength of 42.0 A. Next, a CK X ray intensity Ic of graphite which was a reference sample was calculated from the formula $Ic = Ia' - Ib'$ wherein Ia' was an X ray intensity at a wavelength of 44.6 Å and Ib' was an X ray intensity at a wavelength of 42.0 Å. Then, the formula $I = (Iw/Ic) \times 10^3$ was used to calculate the desired index I. In this connection, each value of Ia, Ib, Ia' and Ib' was an average value in the case that the measurement was carried out three times every 100 seconds.

Test of Crack Resistance in Weld Portion

A laser-welded can cylinder was subjected to flanging, and a bottom plate made of tin free steel the inner surface of which was coated was double-seamed to the can cylinder in order to form a can. A sample was prepared by cutting the double-seam at weld portion and its vicinity of the thus formed can and was then fixed in an embedding organic resin. Afterward, mirror polishing was performed by the use of alumina abrasive material having a diameter of 0.3 $\mu$m so that the double-seaming state in the weld portion might be observed from the direction parallel with a weld direction. Next, for 100 samples per test, the state of the crack occurrence in the double-seamed weld portion was inspected by an optical microscope at 100 magnifications, and test results were classified into the following four ranks:

O: No crack

Δ: There were 1 to 5 samples in each of which 1 or 2 fine cracks were present on the outer surface of the weld portion.

X: There were 6 or more samples in each of which 1 or 2 fine cracks were present on the outer surface of the weld portion.

XX: There was at least 1 crack extending through the weld portion.

Test of Can Storage Properties

An epoxyphenol coating material was applied to the 5-mm-wide weld portion on the inner surface of a laser-welded can cylinder having an inner diameter of 65.3 mm and a height of 104.7 mm so that the average thickness of the coating material film after baking might be 8 to 10 μm, and the thus applied coating material was then baked. Afterward, the can cylinder was subjected to beading, necked-in working and flanging, and a bottom plate made of tinfree steel the inner surface of which was coated was double-seamed to the can cylinder. Then, this can was filled with boiled bonito, and a lid made of tin free steel the inner surface of which was coated was double-seamed to the can. The latter was then sterilized in a retort at 116° C. for 90 latter was then sterilized in a retort at 116° C. for 90 minutes. After stored at 50° C. for 6 months, the packed can was opened, and the corrosion state of the weld portion on the inner surface was inspected. In addition, the number of the cans perforated within 6 months was also counted.

As described in detailed description, the evaluations of the thermal decomposition resistance of the coating film and the welding properties of the weld portion were performed by the procedure and under conditions just described.

EXAMPLES 1 TO 6 AND COMPARATIVE EXAMPLES 1 TO 7

A white ink containing $TiO_2$ was printed on the outer surface of each tin free steel (carbon concentrations of the respective steel plates are shown in Table 1. The components of surface treatment were 110 mg/m² of metallic chromium and 12 mg/m² of hydrated chromium oxide) having a thickness of 0.22 mm so that the thickness of the ink might be 12 μm, and a coating material which would become a coating film for preventing the adhesion of melted metal particles was applied to the whole inner surface of the steel, kind and thickness of the coating material being altered as shown in Table 1. Then, baking was performed. Each steel was cut into blanks, and a second application was then carried out all over the inner surface of each blank except strip portions having a width of 2 mm from the edges of the blank. In the second application, the same coating material as in the first application was used so that the total thickness (after baking) of the first and second coating films might be 10 μm.

Next, each of the printed and applied steel plates was cut into 104.7×206.3 mm blanks, which were then rounded so that the edges of each blank might be butted, in order to form a roll formed blank having an inner diameter of 65.3 mm and a height of 104.7 mm. The blank was then laser-welded by means of an apparatus shown in FIG. 1. Welding conditions were as follows: A welding velocity was 17 m/min., a $CO_2$ gas laser output was 1.0 kW, and a beam spot diameter was 0.20 mm.

With regard to the thus laser-welded can cylinder, the measurements of carbon concentration indexes I and the test results of the crack resistance in the weld portions and storage properties are set forth in Table 1.

EXAMPLES 7 TO 12 AND COMPARATIVE EXAMPLES 8 TO 12

The same procedure as in Examples 1 to 6 and Comparative Examples 1 to 7 was repeated with the exception that the laser beam irradiation was carried out while a cooling device was brought into contact with the butt portion of each roll blank from the inner side thereof in an apparatus shown in FIG. 2 and that of the thickness of the coating films for preventing the of melted metal particles was altered, in order to form laser-welded can.

With regard to the thus laser-welded can, the measurements of carbon concentration indexes I and the test results of the crack resistance in the weld portions and can storage properties are set forth in Table 2.

TABLE 1

| | Sample No. | Carbon Conc. in Steel (wt %) | Coating Film for Preventing Adhesion of Melted Metal Particles | | Carbon Conc. Index I | Crack Resistance | Test Results of Can Storage (N = 100) | |
|---|---|---|---|---|---|---|---|---|
| | | | Organic Resin Coating Material | Thickness (μm) | | | State on Inner Side of Can Weld Portion | Number of Perforated Can |
| Example | 1 | 0.05 | Epoxyphenol | 2.5 | 8 | O | Normal | 0 |
| Example | 2 | 0.08 | Epoxyphenol | 1.5 | 9 | O | " | 0 |
| Example | 3 | 0.07 | Epoxyphenol | 3.0 | 12 | O | " | 0 |
| Example | 4 | 0.06 | Epoxyurea | 2.7 | 10 | O | " | 0 |
| Example | 5 | 0.07 | Epoxyacryl | 2.5 | 9 | O | " | 0 |
| Example | 6 | 0.06 | Thermosetting Vinyl | 3.1 | 11 | O | " | 0 |
| Comp. Ex. | 1 | 0.06 | Epoxyphenol | 0.3 | 6 | O | Bad[*1] | 1 |
| Comp. Ex. | 2 | 0.15 | Epoxyphenol | 2.0 | 16 | Δ | Worse[*2] | 3 |
| Comp. Ex. | 3 | 0.12 | Epoxyphenol | 7.0 | 20 | XX | Worst[*3] | 18 |
| Comp. Ex. | 4 | 0.07 | Epoxyphenol | 8.2 | 22 | XX | " | 15 |
| Comp. Ex. | 5 | 0.06 | Epoxyurea | 5.2 | 17 | X | " | 10 |
| Comp. Ex. | 6 | 0.07 | Epoxyacryl | 6.0 | 18 | X | " | 12 |
| Comp. Ex. | 7 | 0.06 | Thermosetting vinyl | 5.7 | 18 | X | " | 9 |

Note:
[*1] Many spot-like corrosions were present in the weld portion and its vicinity.
[*2] Corrosions were observed simultaneously with the lifting of the coating film in the weld portion.
[*3] Corrosions were observed substantially all over the weld portion.

TABLE 2

| | Sample No. | Carbon Conc. in Steel (wt %) | Coating Film for Preventing Adhesion of Melted Metal Particles | | Carbon Conc. Index I | Crack Resistance | Test Results of Can Storage (N = 100) | |
|---|---|---|---|---|---|---|---|---|
| | | | Organic Resin Coating Material | Thickness (μm) | | | State on Inner Side of Can Weld Portion | Number of Perforated Can |
| Example | 7 | 0.05 | Epoxyphenol | 3.7 | 7 | O | Normal | 0 |
| Example | 8 | 0.05 | Epoxyphenol | 5.5 | 9 | O | " | 0 |
| Example | 9 | 0.08 | Epoxyphenol | 6.5 | 11 | O | " | 0 |
| Example | 10 | 0.06 | Epoxyurea | 5.0 | 11 | O | " | 0 |
| Example | 11 | 0.07 | Epoxyacryl | 5.5 | 12 | O | " | 0 |
| Example | 12 | 0.06 | Thermosetting vinyl | 5.0 | 11 | O | " | 0 |
| Comp. Ex. | 8 | 0.12 | Epoxyphenol | 10.0 | 21 | XX | Worse*[1] | 26 |
| Comp. Ex. | 9 | 0.15 | Epoxyphenol | 6.0 | 17 | X | " | 6 |
| Comp. Ex. | 10 | 0.06 | Epoxyurea | 9.0 | 19 | X | " | 3 |
| Comp. Ex. | 11 | 0.07 | Epoxyacryl | 8.5 | 19 | X | " | 5 |
| Comp. Ex. | 12 | 0.06 | Thermosetting vinyl | 8.3 | 18 | X | " | 4 |

Note:
*[1] Corrosions were observed simultaneously with the lifting of the coating film in the weld portion.

EXAMPLES 13 TO 27 AND COMPARATIVE EXAMPLES 13 TO 18

In Examples 13 to 27 and Comparative Examples 13 to 18, the coating material in Example 1 was applied to the inner surfaces of cans, and the coating materials in Table 3 were applied to the outer surfaces thereof. That is, these coating materials were applied to the outer surfaces of metal plates, i.e., tin free steel (thickness 0.21 mm), tinplates (Thickness 0.21 mm) and so that the thickness of each coating film might be 10 μm, and these plates were then baked under predetermined conditions.

The thermal decomposition resistance of the coating films was evaluated by using film samples peeled from similarly applied metal plates which were prepared separately from the above. The measurement procedure and conditions for the evaluation were as described above. The results are set forth in Table 3.

Next, each of the above applied metal plates was then cut into blanks for cans having a predetermined size. Each blank was roll-formed so that the applied surface might be the outer surface, and the edges of the blank were then butted. The thus butted portion was then irradiated with a $CO_2$ laser beam spot to perform welding.

The welding conditions were as follows: A $CO_2$ laser beam wavelength λ was 10.6 μm, a laser output was 1 kW, a laser beam spot diameter was 0.2 mm, a welding velocity was 15 m/min., and in this case, a power density was $3.2 \times 10^6$ W/cm$^2$.

The weld state was evaluated by measuring a melt area in the cross section of each weld portion visually and through a microscope.

For comparison, the reference value of a melt area in the case that an epoxy esteramino coating material alone was applied was regarded as 100.

The results are set forth in Table 4. When the coating materials of the present invention were used, high heating efficiency and good weld state could be obtained.

TABLE 3

Compositions of Various Coating Materials

| | Component of Coating Material |
|---|---|
| Example 13 | Phenol |
| Example 14 | Epoxy/phenol |
| Example 15 | Epoxy ester/amino + PTFE (30 phr to solid content of resin) |
| Example 16 | Acryl/amino + PTFE (30 phr to solid content of resin) |
| Example 17 | Alkyd/amino + PTFE (30 phr to solid content of resin) |
| Example 18 | Epoxy/urea + PTFE (30 phr to solid content of resin) |
| Example 19 | Oily coating material + PTFE (30 phr to solid content of resin) |
| Example 20 | Polyester + PTFE (30 phr to solid content of resin) |
| Example 21 | Epoxy ester/amino + PVDF (30 phr to solid content of resin) |
| Example 22 | Epoxy ester/amino + polyamide-imide (30 phr to solid content of resin) |
| Example 23 | Epoxy ester/amino + polyimide [KIR-30] (30 phr to solid content of resin) |
| Example 24 | Epoxy ester/amino + polyether sulfone (30 phr to solid content of resin) |
| Example 25 | Epoxy ester/amino + phosphate [TCP] (20 phr to solid content of resin) |
| Example 26 | Epoxy ester/amino + ammonium phosphate (20 phr to solid content of resin) |
| Example 27 | Polyimide [CT-430] |
| Comp. Ex. 13 | Epoxy ester-amino |
| Comp. Ex. 14 | Acrylamino |
| Comp. Ex. 15 | Alkydamino |
| Comp. Ex. 16 | Epoxyurea |
| Comp. Ex. 17 | Oily coating material |
| Comp. Ex. 18 | Polyester |

Notes:
PTFE (ethylene tetrafluoride resin, particle diameter 5 to 10 μm; Central Glass Co., Ltd.; TFO-F)
PVDF (vinylidene fluoride resin, powder; Kureha Chemical Industry Co., Ltd.; #1000)
Polyamide-imide (Mitsubishi Chemical Industries, Ltd.; FT)
Polyimide (powder KIR-30 and solution CT-430)
Polyether sulfone (powder; ICI Japan; 4800P)
Phosphate (TCP: tricresyl phosphate)
The unit "phr" represents part(s) by weight based on 100 parts by weight of a usual coating resin for cans.

TABLE 4

Comparison of Weldabilities of Various Coating Materials

| | Heat Resistance [T50] (°C.) | Area Ratio Heated & Melted Portion of Metal Plate by Laser Irradiation | Cross Section Observation Results of Can Weld Portion (visual and microscope) |
|---|---|---|---|
| Example 13 | 490 | 400 | good |
| Example 14 | 470 | 350 | " |
| Example 15 | 470 | 350 | " |
| Example 16 | 470 | 350 | " |
| Example 17 | 480 | 360 | " |
| Example 18 | 480 | 360 | " |
| Example 19 | 490 | 380 | " |
| Example 20 | 470 | 350 | " |
| Example 21 | 470 | 350 | " |

TABLE 4-continued
Comparison of Weldabilities of Various Coating Materials

| | Heat Resistance [T50] (°C.) | Area Ratio Heated & Melted Portion of Metal Plate by Laser Irradiation | Cross Section Observation Results of Can Weld Portion (visual and microscope) |
|---|---|---|---|
| Example 22 | 490 | 400 | " |
| Example 23 | 500 | 400 | " |
| Example 24 | 480 | 380 | " |
| Example 25 | 470 | 350 | " |
| Example 26 | 470 | 360 | " |
| Example 27 | 590 | 440 | " |
| Comp. Ex. 13 | 440 | 100 | Weld was impossible |
| Comp. Ex. 14 | 440 | 100 | " |
| Comp. Ex. 15 | 450 | 120 | " |
| Comp. Ex. 16 | 450 | 130 | " |
| Comp. Ex. 17 | 455 | 150 | " |
| Comp. Ex. 18 | 430 | 90 | " |

EXAMPLES 28 TO 35 AND COMPARATIVE EXAMPLES 19 TO 25

In Examples 28 to 35 and Comparative Examples 19 to 25, the coating material in Example 4 was applied to the inner surfaces of cans, and the coating materials in Table 5 were applied to the outer surfaces thereof. That is, these coating materials were applied to the outer surfaces of metal plates, i.e., tin free steel plates (thickness 0.21 mm), tinplates (thickness 0.21 mm) so that the thickness of each coating film might be 10 μm, and these plates were then baked under predetermined conditions.

Each of the applied metal plates was then cut into blanks for cans having a predetermined size. Each blank was roll-formed so that the applied surface might be the outer surface, and the edges of the blank were then butted. The thus butted portion was then irradiated with a $CO_2$ laser beam to perform welding.

The welding conditions were as follows: A $CO_2$ laser beam wavelength λ was 10.6 μm, a laser output was 1 kW, a laser beam diameter was 0.2 mm, a welding velocity was 15 m/min., and in this case, a power density was $3.2 \times 10^6$ W/cm$^2$.

The weld state was evaluated by measuring a melt area in the cross section of each weld portion visually and through a microscope.

For comparison, the reference value of a melt area in the case that an epoxy esteramino coating material alone was applied was regarded as 100.

The results are set forth in Table 6. When the coating materials of the present invention were used, high heating efficiency and good weld state could be obtained.

TABLE 5
Compositions of Various Coating Materials

| | Component of Coating Material | Parts by Weight of Filler to Solid Content of Coating Material (phr) |
|---|---|---|
| Example 28 | Epoxy ester-amino + titanium oxide (a) | 50 |
| Example 29 | Epoxy ester-amino + titanium oxide (a) | 100 |
| Example 30 | Acrylamino + titanium oxide (a) | 100 |
| Example 31 | Alkydamino + titanium oxide (a) | 100 |
| Example 32 | Epoxyurea + titanium oxide (a) | 100 |
| Example 33 | Oily coating material + titanium oxide (a) | 100 |
| Example 34 | Polyester + titanium oxide (a) | 100 |
| Example 35 | Epoxy esteramino + titanium oxide (b) | 50 |
| Comp. Ex. 19 | Epoxy esteramino + mica | 100 |
| Comp. Ex. 20 | Epoxy esteramino | — |
| Comp. Ex. 21 | Acrylamino | — |
| Comp. Ex. 22 | Alkydamino | — |
| Comp. Ex. 23 | Epoxyurea | — |
| Comp. Ex. 24 | Oily coating material | — |
| Comp. Ex. 25 | Polyester | — |

Notes:
Titanium oxide:
(a) Teikoku Kako Co., Ltd.; JR-701
(b) Teikoku Kako Co., Ltd.; MT-500B,
Mica: Wakita Kogyo Co., Ltd.; #7500

TABLE 6
Cross Section Observation of Laser Irradiation Portion and Weld Portion

| | Area Ratio Heated & Melted Portion of Metal Plate by Laser Irradiation | Cross Section Observation Results of Can Weld Portion (visual and microscope) |
|---|---|---|
| Example 28 | 350 | good |
| Example 29 | 400 | " |
| Example 30 | 400 | " |
| Example 31 | 470 | " |
| Example 32 | 500 | " |
| Example 33 | 520 | " |
| Example 34 | 400 | " |
| Example 35 | 390 | " |
| Comp. Ex. 19 | 180 | Bad (partially unwelded) |
| Comp. Ex. 20 | 100 | Weld was impossible |
| Comp. Ex. 21 | 100 | " |
| Comp. Ex. 22 | 120 | " |
| Comp. Ex. 23 | 130 | " |
| Comp. Ex. 24 | 150 | " |
| Comp. Ex. 25 | 90 | " |

EXAMPLES 36 TO 46 AND COMPARATIVE EXAMPLES 26 TO 31

In Examples 36 to 46 and Comparative Examples 26 to 31, the coating material in Example 5 was applied to the inner surfaces of the cans, and the coating materials in Table 7 were applied to the outer surfaces thereof. In the right column of Table 7, there are set forth percent by volume of metallic powder fillers to the solid contents of resins. That is, these coating materials were applied to the outer surface of metal plates, i.e., tin free steel plates (thickness 0.21 mm), tinplates (thickness 0.21 mm) so that the thickness of each coating film might be 10 μm, and these plates were then baked under predetermined conditions.

Each of the applied metal plates was then cut into blanks for cans having a predetermined size. Each blank was roll-formed so that the applied surface might be the outer surface, and the edges of the blank were then butted. The thus butted portion was then irradiated with a $CO_2$ laser beam spot to perform welding.

The welding conditions were as follows: A $CO_2$ laser beam wavelength λ was 10.6 μm, a laser output was 1 kW, a laser beam diameter was 0.2 mm, a welding velocity was 15 m/min., and in this case, a power density was $3.2 \times 10^6$ W/cm$^2$.

The weld state was evaluated by measuring a melt area in the cross section of each weld portion visually and through a microscope.

For comparison, the reference value of a melt area in the case that an epoxy esteramino coating material alone was applied was regarded as 100.

The results are set forth in Table 8. When the coating materials of the present invention were used, high heating efficiency and good weld state could be obtained.

TABLE 7

Compositions of Various Coating Materials

| | Component of Coating Material | Percent by Volume of Filler to Solid Content of Coating Material (vol %) |
|---|---|---|
| Example 36 | Epoxy esteramino + Al (a) | 10 |
| Example 37 | Epoxy esteramino + Al (a) | 25 |
| Example 38 | Acrylamino + Al (a) | 10 |
| Example 39 | Alkydamino + Al (a) | 10 |
| Example 40 | Epoxyurea + Al (a) | 10 |
| Example 41 | Oily coating material + Al (a) | 10 |
| Example 42 | Polyester + Al (a) | 10 |
| Example 43 | Epoxy ester-amino + Ni (a) | 10 |
| Example 44 | Epoxy ester-amino + Ni (b) | 5 |
| Example 45 | Epoxy ester-amino + Sn | 10 |
| Example 46 | Epoxy ester-amino + Zn | 10 |
| Comp. Ex. 26 | Epoxy ester amino | — |
| Comp. Ex. 27 | Acrylamino | — |
| Comp. Ex. 28 | Alkydamino | — |
| Comp. Ex. 29 | Epoxyurea | — |
| Comp. Ex. 30 | Oily coating material | — |
| Comp. Ex. 31 | Polyester | — |

Notes:
Al:
(a) Toyo Aluminium K.K.; Alpaste 0100M; average grain diameter 7 μm
(b) Toyo Aluminium K.K.; AC-1003; average grain diameter 30 μm
Ni:
(a) Fukuda Metal Foil & Powder Corporation; NP-287; average grain diameter 5 μm
(b) ULVAC; NMH-P4-03; average grain diameter 0.03 μm
Sn: Fukuda Metal Foil & Powder Corporation; Sn—S; average grain diameter 15 μm
Zn: Fukuda Metal Foil & Powder Corporation; Zn—S; average grain diameter 10 μm

TABLE 8

Cross Section observation of Laser Irradiation Portion and Weld Portion

| | Area Ratio Heated & Melted Portion of Metal Plate by Laser Irradiation | Cross Section Observation Results of Can Weld Portion (visual and microscope) |
|---|---|---|
| Example 36 | 390 | good |
| Example 37 | 510 | " |
| Example 38 | 390 | " |
| Example 39 | 400 | " |
| Example 40 | 400 | " |
| Example 41 | 420 | " |
| Example 42 | 390 | " |
| Example 43 | 410 | " |
| Example 44 | 370 | " |
| Example 45 | 400 | " |
| Example 46 | 390 | " |
| Comp. Ex. 26 | 100 | Weld was impossible |
| Comp. Ex. 27 | 100 | " |
| Comp. Ex. 28 | 120 | " |
| Comp. Ex. 29 | 130 | " |
| Comp. Ex. 30 | 150 | " |
| Comp. Ex. 31 | 90 | " |

EXAMPLES 47 TO 57 AND COMPARATIVE EXAMPLES 32 TO 37

In Examples 47 to 57 and Comparative Examples 32 to 37, the coating material in Example 7 was applied to the inner surfaces of the cans, and the coating materials in Table 9 were applied to the outer surfaces thereof. In the right column of Table 9, there are set forth parts by weight of organopolysiloxanes to the solid contents of coating materials. That is, these coating materials were applied to the outer surfaces of metal plates, i.e., tin free steel plates (thickness 0.21 mm), tinplates (thickness 0.21 mm) - so that the thickness of each coating film might be 10 μm, and these plates were then baked under predetermined conditions.

Each of the applied metal plates was then cut into blanks for cans having a predetermined size. Each blank was roll-formed so that the applied surface might be the outer surface, and the edges of the blank were then butted. The thus butted portion was then irradiated with a CO$_2$ laser beam to perform welding.

The welding conditions were as follows: A CO$_2$ laser beam wavelength λ was 10.6 μm, a laser output was 1 kW, a laser beam diameter was 0.2 mm, a welding velocity was 15 m/min., and in this case, a power density was $3.2 \times 10^6$ W/cm$^2$. The weld state was evaluated by measuring a melt area in the cross section of each weld portion visually and through a microscope.

For comparison, the reference value of a melt area in the case that an epoxy esteramino coating material alone was applied was regarded as 100.

The results are set forth in Table 10. When the coating materials of the present invention were used, high heating efficiency and good weld state could be obtained.

TABLE 9

Compositions of Various Coating Materials

| | Component of Coating Material | Parts by Weight to Solid Content to Coating Material (phr) |
|---|---|---|
| Example 47 | Dimethyl polysiloxane (a) | — |
| Example 48 | Epoxy ester-amino + dimethyl polysiloxane (a) | 10 |
| Example 49 | Epoxy ester-amino + dimethyl polysiloxane (a) | 25 |
| Example 50 | Epoxy ester-amino + dimethyl polysiloxane (a) | 50 |
| Example 51 | Acrylamino + dimethyl polysiloxane (b) | 25 |
| Example 52 | Alkydamino + dimethyl polysiloxane (b) | 25 |
| Example 53 | Epoxyurea + dimethyl polysiloxane (b) | 25 |
| Example 54 | Oily coating material + dimethyl polysiloxane (b) | 25 |
| Example 55 | Polyester + dimethyl polysiloxane (b) | 25 |
| Example 56 | Epoxy ester-amino + methyl-phenyl polysiloxane | 25 |
| Example 57 | Siliconeepoxy | — |
| Comp. Ex. 32 | Epoxy ester-aMINO | — |
| Comp. Ex. 33 | Acrylamino | — |
| Comp. Ex. 34 | Alkydamino | — |
| Comp. Ex. 35 | Epoxyurea | — |
| Comp. Ex. 36 | Oily coating material | — |
| Comp. Ex. 37 | Polyester | — |

Notes:
Dimethyl polysiloxane
(a) Solution: Toray Silicone Co., Ltd.; SR-2400; solid content 50%
(b) Powder: Toray Silicone Co., Ltd.; XC99-501; average grain diameter 2 μm
Methylphenyl polysiloxane (solution) Toray Silicone Co., Ltd.; SH-805; solid content 50%
Silicone/Epoxy (copolymer) Toray Silicone Co., Ltd.; SR-2115; solid content 50%

TABLE 10

Cross Section Observation of Laser Irradiation Portion and Weld Portion

| | Area Ratio Heated & Melted Portion of Metal Plate by Laser Irradaition | Cross Section Observation Results of Can Weld Portion (visual and microscope) |
|---|---|---|
| Example 47 | 570 | good |
| Example 48 | 400 | " |
| Example 49 | 460 | " |
| Example 50 | 500 | " |
| Example 51 | 460 | " |
| Example 52 | 480 | " |
| Example 53 | 480 | " |
| Example 54 | 500 | " |
| Example 55 | 450 | " |
| Example 56 | 470 | " |
| Example 57 | 400 | " |
| Comp. Ex. 32 | 100 | Weld was impossible |
| Comp. Ex. 33 | 100 | " |
| Comp. Ex. 34 | 120 | " |
| Comp. Ex. 35 | 130 | " |
| Comp. Ex. 36 | 150 | " |
| Comp. Ex. 37 | 90 | " |

What is claimed is:

1. Butt-welded cans made of steel plates having a carbon concentration of 0.02 to 0.09% by weight, said butt-welded cans being characterized in that a coating film for preventing the adhesion of melted metal particles is applied to at least the inner surface of the weld portion and its vicinity of each can, and a carbon concentration index I of said weld portion satisfies the formula (1)

$$I (Iw/Ic) \times 10^3 \leq 15 \tag{1}$$

wherein

Iw is a $K\alpha$ X ray intensity, of carbon in said weld portion, measured by the EPMA method, and Ic is a $K\alpha$ X ray intensity, of carbon in graphite, measured by the EPMA method.

2. Butt-welded cans according to claim 1 wherein said coating film for preventing the adhesion of the melted metal particles is an organic resin coating film.

3. Butt-welded cans according to claim 1 wherein said coating film for preventing the adhesion of the melted metal particles has a thickness of 0.5 to 3.5 $\mu$m.

4. Butt-welded cans according to claim 2 wherein said organic resin coating film is composed of one or more coating materials selected from the group consisting of phenolepoxy coating materials, aminoepoxy coating materials, vinyl chloride-vinyl acetate copolymers, partially saponified vinyl chloride-vinyl acetate copolymers, vinyl chloride-vinyl acetate-maleic anhydride copolymers, epoxy-modified, epxoyamino-modified and epoxyphenol-modified vinyl resin coating materials, acrylic resin coating materials, and synthetic rubber coating materials typified by styrene-butadiene copolymers.

* * * * *